United States Patent
Seo et al.

(10) Patent No.: US 9,097,872 B2
(45) Date of Patent: Aug. 4, 2015

(54) HIGH DENSITY TELECOMMUNICATIONS PATCHING SYSTEM AND CASSETTES

(71) Applicants: Deborah A. Chambers, Asheville, NC (US) Optical Cable Corporation, Roanoke, VA (US)

(72) Inventors: Sumio Seo, Wallingford, VT (US); Ian J. Timmins, Asheville, NC (US); James Yanik, Asheville, NC (US); R. Bruce Smith, Asheville, NC (US); Derrick F. Stikeleather, Swannanoa, NC (US); Sterling A. Vaden, Black Mountain, NC (US)

(73) Assignee: Optical Cable Corporation, Roanoke, VA (US)

( * ) Notice: Subject to any disclaimer, the term of this patent is extended or adjusted under 35 U.S.C. 154(b) by 316 days.

(21) Appl. No.: 13/670,600

(22) Filed: Nov. 7, 2012

(65) Prior Publication Data

US 2013/0121657 A1    May 16, 2013

Related U.S. Application Data

(60) Provisional application No. 61/556,857, filed on Nov. 8, 2011.

(51) Int. Cl.
*G02B 6/44* (2006.01)
*G02B 6/40* (2006.01)

(52) U.S. Cl.
CPC ............ *G02B 6/4453* (2013.01); *G02B 6/4455* (2013.01); *G02B 6/4471* (2013.01)

(58) Field of Classification Search
CPC ... G02B 6/4453; G02B 6/4471; G02B 6/4455
See application file for complete search history.

(56) References Cited

U.S. PATENT DOCUMENTS

| | | | |
|---|---|---|---|
| 5,497,444 A | 3/1996 | Wheeler | |
| 5,758,003 A | 5/1998 | Wheeler et al. | |
| 6,363,198 B1 | 3/2002 | Braga et al. | |
| 7,672,561 B1 | 3/2010 | Keith et al. | |
| 7,787,260 B2 * | 8/2010 | Hruby et al. | 361/827 |
| 7,856,166 B2 | 12/2010 | Biribuze et al. | |
| 8,520,408 B2 * | 8/2013 | Hruby et al. | 361/827 |
| 2009/0097813 A1 * | 4/2009 | Hill | 385/135 |
| 2009/0324189 A1 * | 12/2009 | Hill et al. | 385/135 |
| 2010/0061064 A1 * | 3/2010 | Murano et al. | 361/725 |
| 2010/0142910 A1 * | 6/2010 | Hill et al. | 385/135 |
| 2014/0079365 A1 * | 3/2014 | Hill et al. | 385/135 |
| 2014/0161410 A1 * | 6/2014 | Thijs et al. | 385/135 |

* cited by examiner

*Primary Examiner* — Akm Enayet Ullah
(74) *Attorney, Agent, or Firm* — The Van Winkle Law Firm; David M. Carter

(57) ABSTRACT

A telecommunications patching system is provided having a panel and at least one cassette movably received in the panel. The cassette receives a plurality of telecommunication jacks. The panel and cassettes are oriented horizontally. Each jack includes a front cavity adapted to receive a patch cord plug having a patch cord cable extending therefrom. The cassette has first and second ends. A cable management tab extends from the first end of the cassette so that the cassette may be readily moved to different positions in the panel.

18 Claims, 9 Drawing Sheets

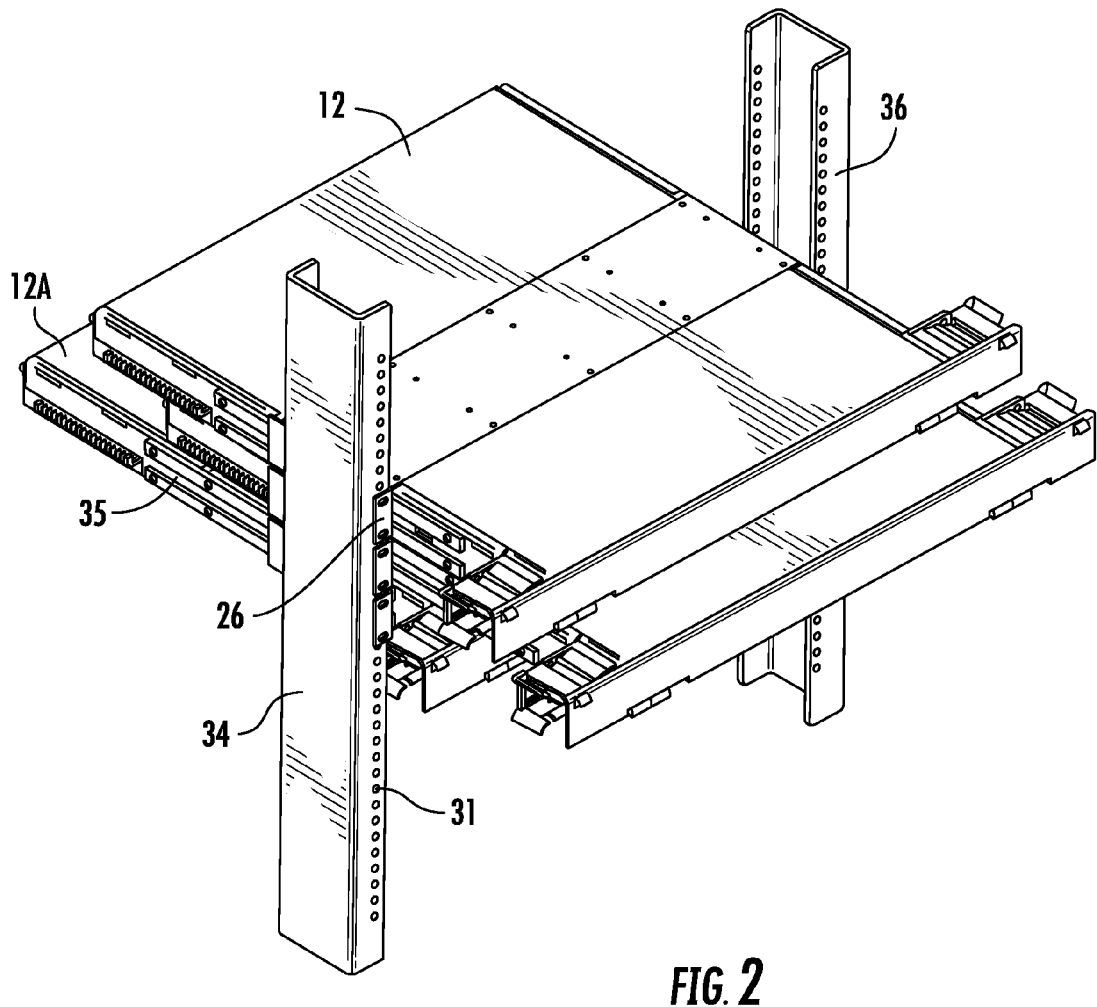
FIG. 2
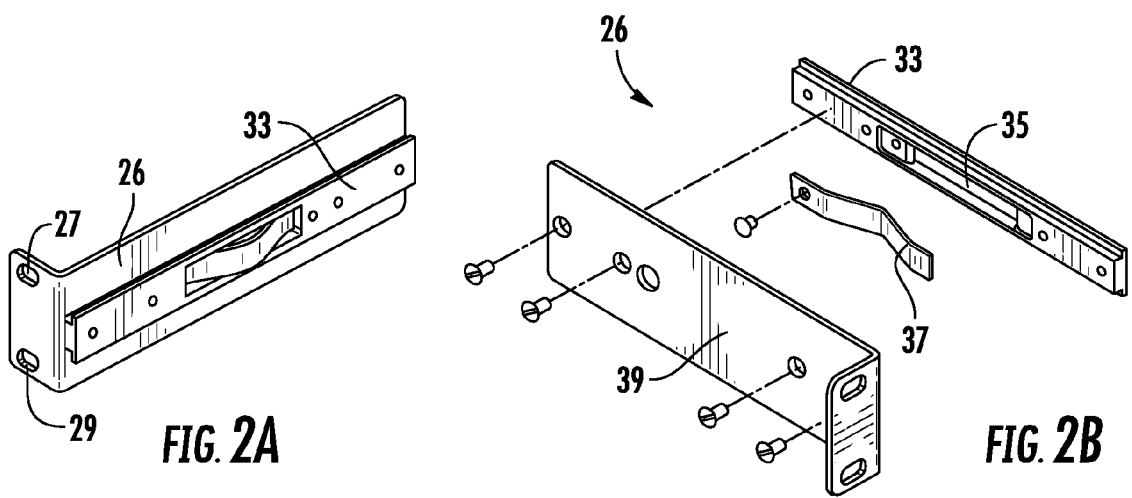
FIG. 2A
FIG. 2B

HIGH DENSITY TELECOMMUNICATIONS PATCHING SYSTEM AND CASSETTES

RELATED APPLICATION

This is a U.S. non-provisional application relating to and claiming the benefit of U.S. Provisional Patent Application Ser. No. 61/556,857 filed Nov. 8, 2011.

BACKGROUND

This invention relates to optical fiber telecommunications interconnection systems. As used herein, the term "telecommunications" includes voice, data, audio and video communications. The telecommunications industry has begun employing optical fibers as a means for signal transmissions, including voice, video and data. The primary advantage of optical fibers over copper wire is substantially increased broadband However, like copper wire systems, optical fiber systems require patching or interconnection between incoming land line optical cables and distribution cables which connect to various devices in a building. Typical optical fiber patching systems are shown in U.S. Pat. Nos. 7,672,561 and 6,363,198. These patching systems are usually housed in a panel which is mounted on frames and racks which, in turn, are typically located in a communications closet or a data room. Examples of optical fiber distribution frames and racks are disclosed in U.S. Pat. Nos. 5,497,444 and 5,758,003.

It is important that these panels are readily accessible by a technician and in addition, it is important that the interconnections are easy to make. Also, because of the large number of cables which are being interconnected within a panel, it is important that the cables be managed in such a way that when the technician handles the cables, excess bending of the cables does not occur and the cable remains organized.

SUMMARY OF THE INVENTION

In accordance with one form of this invention, there is provided a telecommunications patching system, including a panel. At least one cassette is provided and is adapted to be movably received in the panel. The cassette receives a plurality of telecommunication connector jacks. Each jack has a front cavity adapted to receive a patch cord plug having a patch cord cable extending therefrom. The cassette has first and second ends. A tab extends from the first end of the cassette so that the cassette may readily be moved to different positions in the panel. Preferably, the tab includes cable management channels.

In accordance with another form of this invention, there is provided a telecommunications patching system, including a panel oriented horizontally. The panel includes a front end, a rear end, and first and second sides. A plurality of cassettes are received in the panel. The cassettes are also oriented horizontally. Each cassette receives a plurality of telecommunication connector jacks, Each jack has a front cavity adapted to receive a patch cord plug having a patch cord cable extending therefrom wherein a plurality of patch cord cables extend from the cassette. A cable management device is attached to the panel near the intersection of the front end and first side of the panel for receiving at least some of the patch cord cables. Preferably, the cable management device is a multi-channel clip with patch cord cables received in each channel. It is also preferred that a second identical cable management device be attached to the panel near the intersection of the front end and second side of the panel.

In accordance with yet another form of this invention, there is provided a telecommunication patching system, including a panel having at least one rail. At least one cassette is provided and is adapted to be movably received in the panel. The cassette receives a plurality of telecommunication connector jacks. The cassette has a first and second side. The first side of the cassette engages the rail. A spring member is attached to the first side of the cassette or to the rail. The rail or the first side of the cassette includes at least one pocket for engaging the spring member so that the cassette may be secured at a first position within the panel. Preferably, the spring member is attached to the first side of the cassette and the pocket is on the rail. Also preferably, the rail has at least two pockets so that the cassette may be secured at multiple positions in the panel. Also preferably, there is an additional spring member on the second side of the cassette which engages multiple pockets on another rail.

In accordance with still another form of this invention, there is provided a telecommunication patching system, including a panel having a front portion and a rear portion. At least one cassette having a front end and a rear end is received in the panel. The front end of the cassette receives a plurality of telecommunication connector jacks. A plurality of trunk cables is received at the rear portion of the panel and extend to the rear end of the cassette for interconnection with the jacks. A trunk cable capture mechanism is attached to the rear portion of the panel for securing the trunk cable in place.

BRIEF DESCRIPTION OF THE DRAWINGS

FIG. 2 is a perspective view of three of the panels shown in FIG. 1 stacked and mounted on rack uprights.

FIG. 2A is a perspective view showing the bracket shown in FIG. 2.

FIG. 2B is an exploded view of the bracket of FIG. 2A.

DESCRIPTION OF THE PREFERRED EMBODIMENT

There is provided an improved high density telecommunications patching system including an improved panel and an improved cassette which is received within the panel which contains telecommunication connector jacks, preferably fiber optic jacks. As used herein, the term "jack(s)" includes any female connector(s) such as optical couplers and electrical jacks and the term "panel" includes enclosures and their panels which house cassettes.

Figure 1:
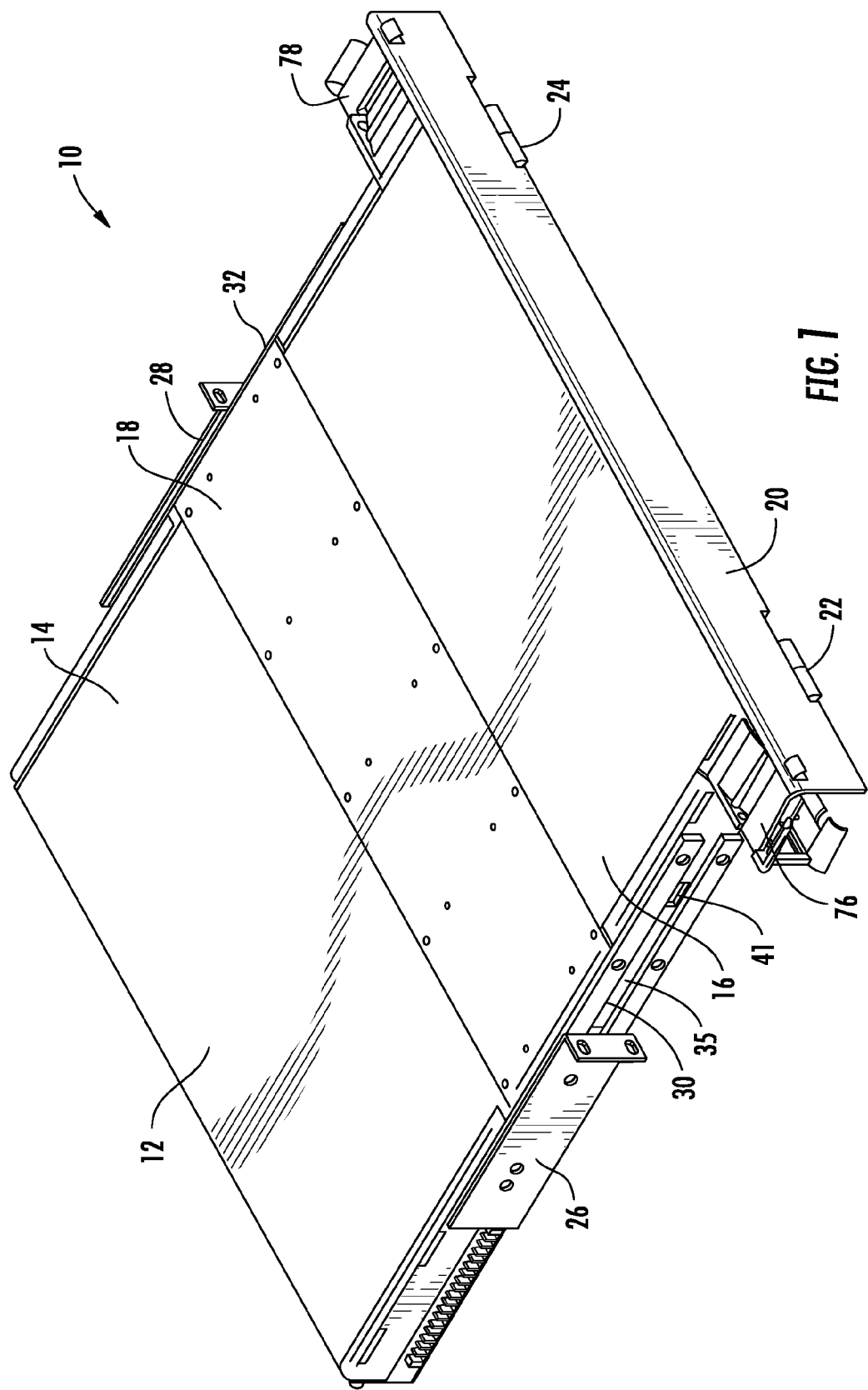
FIG. 1 is a perspective view of a panel in accordance with the teachings of this invention.

FIG. 1 shows patching system 10 including panel 12 having top portions 14 and 16 which are readily removable for easy access by a technician and top portion 18 which is less readily removable. Panel 12 also includes front cover 20 mounted to hinges 22 and 24. Brackets 26 and 28 are respectively connected to rack uprights 34 and 36, shown in FIG. 2, which engage with the sides 30 and 32 of panel 12, Brackets 26 and 28 enable panel 12 to be slidably mounted to the rack, As further illustrated in FIG. 2, a plurality of panels, such as panels 12 and 12A, are adapted to be mounted on uprights 34 and 36. Again, as illustrated in FIG. 2, panels 12 and 12A are mounted horizontally and may be offset from one another since the panels may be slid on brackets 26 and 26. Since brackets 26 and 28 are identical, only bracket 26 will be described below.

FIG. 2A shows "L" shaped bracket 26 having holes 27 and 29 which align with the holes 31 on upright 34 for adjusting the vertical position of panel 12. Screws are received in holes 27, 29 and 31 and are secured by bolts (not shown). Bracket 26 includes elongated rail 33 which interfaces with channel 35 on side 30 of panel 12, as shown in FIG. 2, enabling the panel 12 to be slid to various positions. Channel 35 includes aperture 35A receiving spring clip 37. Spring clip 37 is attached to L-shaped support 39. Spring clip 37 is bowed outwardly. Channel 35 on side 30 of panel 12 includes pocket 41 which captures bowed out portion of spring clip 37 to hold the panel in a predetermined but movable position. Thus, panels 12 and 12A may be offset from one another within the rack to enable a technician to more easily access the panels.

Figure 3:
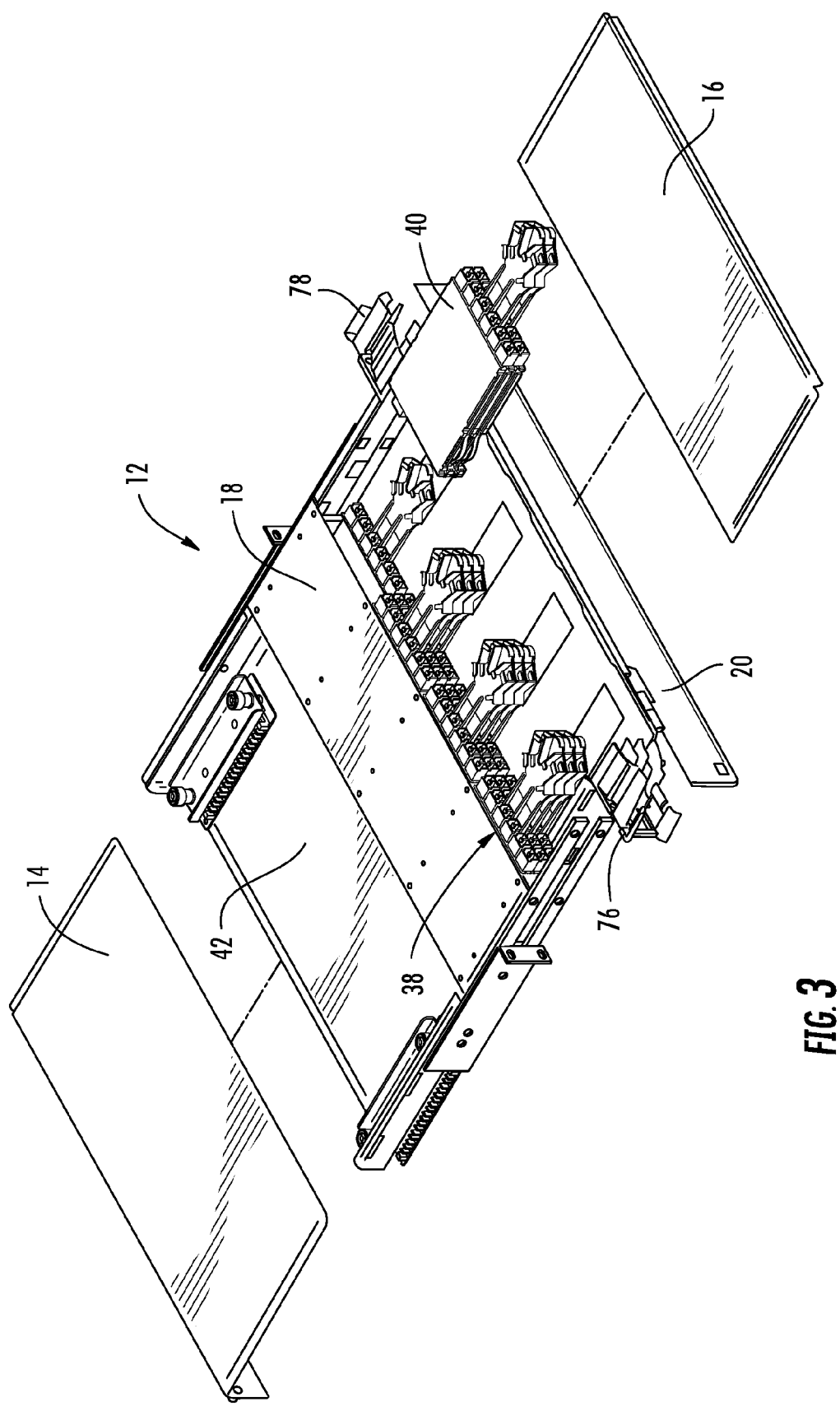
FIG. 3 is a perspective view of the rack of FIG. 1 with top covers removed illustrating the cassettes.

FIG. 3 shows panel 12 with top portions 14 and 16 removed and with the front 20 in its open position, allowing access to the interior of panel 12 by a technician. Panel 12 receives four rows 38 of cassettes 40 which are better illustrated in reference to FIG. 4. Each row 38 includes three, preferably identical, cassettes 40 which are stacked adjacent to one another. The cassettes 40 are slidably received within panel 12. With tops 14 and 16 removable, a technician can easily access the cassettes by sliding them forward or backward from their normal positions under top 18.

Figure 4:
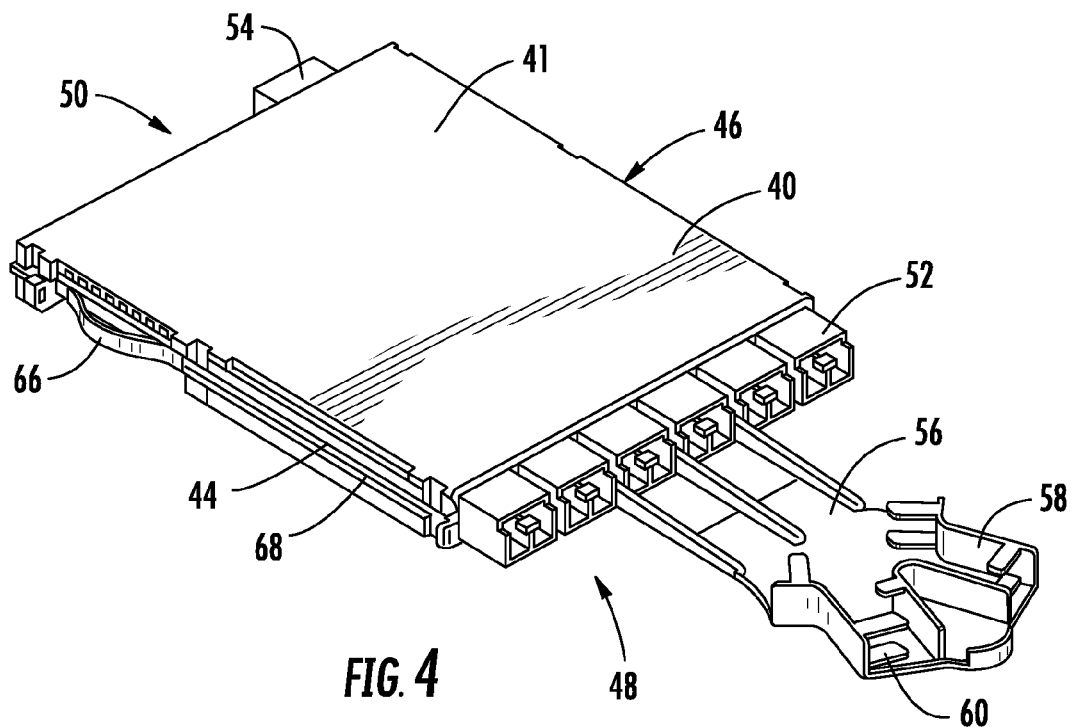
FIG. 4 is a perspective view of a cassette of FIG. 3.

Referring now more particularly to FIG. 4, cassette 40 includes top 41, sides 44 and 46, front 48 and rear 50. Front 48 preferably receives up to six telecommunication connector jacks 52 which may be electrical but are preferably optical. In the embodiment shown in FIGS. 4 and 5, each jack 52 includes two cavities for receiving two plugs 65. Rear 50 preferably includes three optical fiber jacks 54. Alternatively, jacks 54 may be omitted and cable connections may be made directly to jacks 52. The optical fiber jacks 52 on the front 48 of the cassette 40 are adapted to be connected to optical fiber cable which is to be distributed to various devices and outlets in a building. Optical fiber jacks 54 on the rear 50 of cassette 40 are adapted to be connected to optical fiber trunk cable coming from outside of the building, such as from a telephone company central office or data center. Jacks 52 and 54 are connected together within cassette 40 by known optical fiber interconnection techniques. Elongated tab 56 is attached to and preferably made integral with the front 48 of cassette 40. Tab 56 includes cable guides in the form of channels 58 and 60. Cassettes 40 may also be reversed from the direction shown in FIG. 3, That is, front 48 of cassette 40 could face the rear of panel 12.

Figure 5:
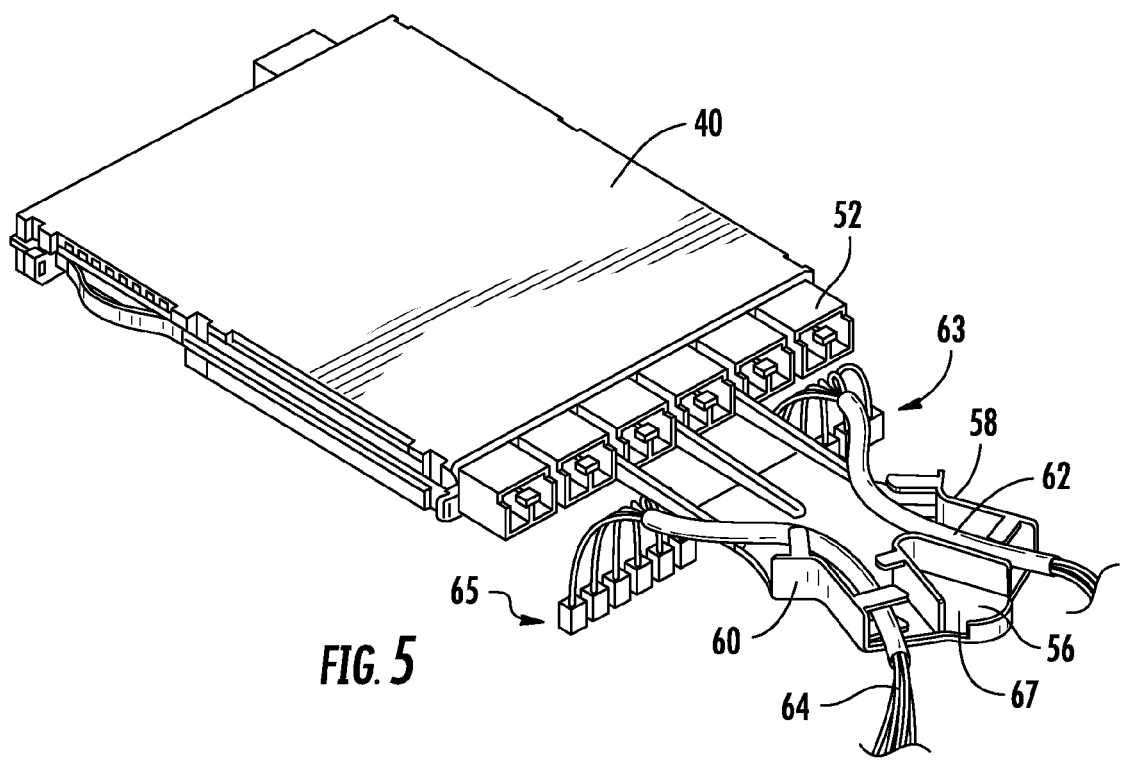
FIG. 5 is a perspective view of a cassette of FIG. 3 showing patch cord cables extending from the cassette.

As illustrated in FIG. 5, cable guide 58 receives, holds, guides and organizes patch cord cables 62 attached to the right six plugs 63 which are adapted to be connected to the right three jacks of cassette 40 and cable guide 60 receives, holds, guides and organizes patch cord cables 64 attached to the left six plugs 65 which are adapted to be connected to the left three of the jacks 52. Tab 56 riot only guides and organizes cables 62 and 64, but also serves as a handle so that cassette 40 can be easily pulled out of and pushed back into position in panel. Tab 56, which includes gripping region 67, therefore enables the technician to easily move the cassette 40 within panel 12 without touching the cables. Thus, tab 56 performs a dual function.

Figure 6:
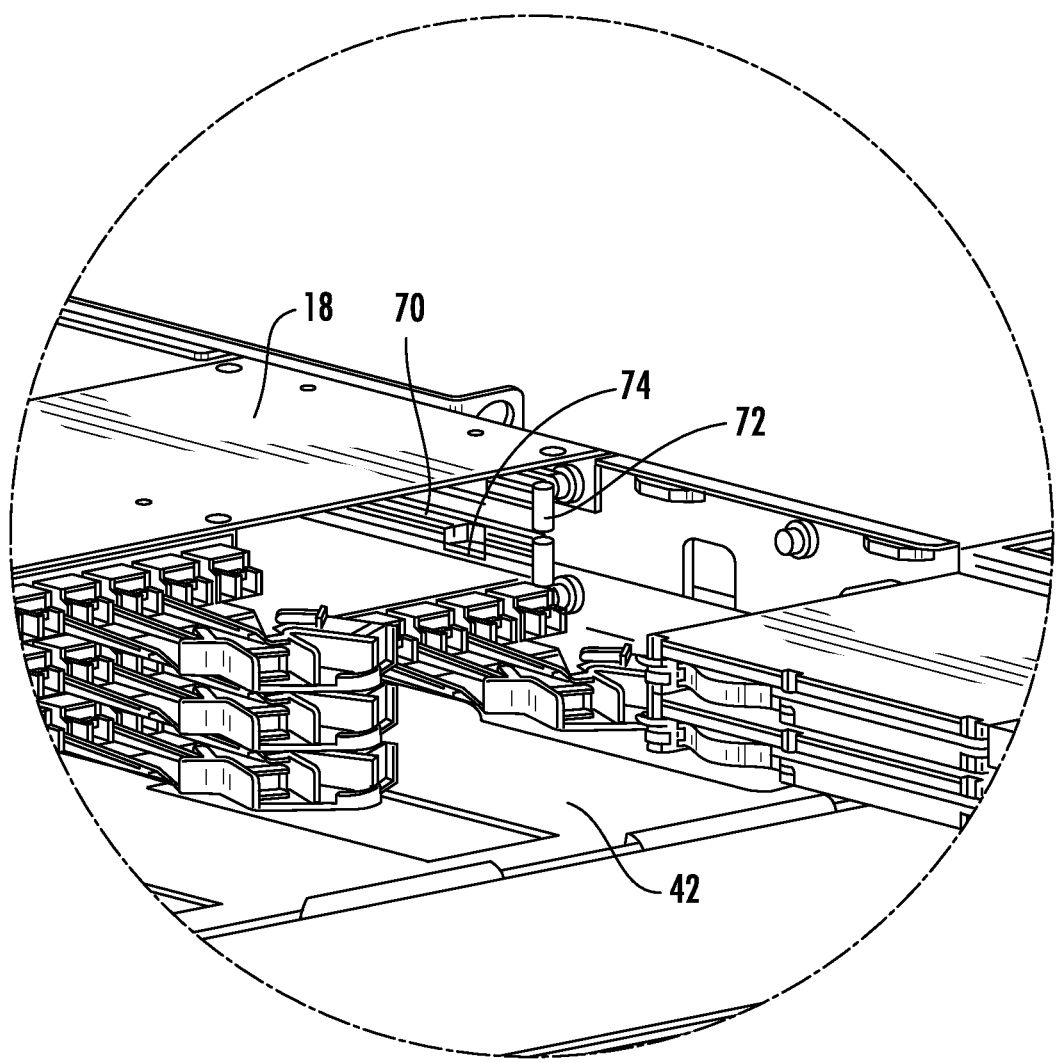
FIG. 6 is a more detailed view of a portion of FIG. 3 but at a different angle.

Referring now to FIG. 4, cassette 40 includes two bow clips 66 connected to sides 44 and 46. Bow clips 66 function as springs. Cassette 40 includes rails 68 projecting from sides 44 and 46. Rails 68 are received in grooves 70 in plate 72, situated between top 18 and bottom 42 of panel 12 as shown in FIG. 6 and between both sides of cassette 40. The grooves 70 include pockets 74 which are adapted to receive bow clip 66 to help hold the cassette in place. It should be noted, however, that these cassettes 40 are not locked in place by the bow clips 66 and the pockets 74. The bow clip 66 provides a resistance to movement. However, a technician may readily move the cassette using tab 56 with minimal effort. The positioning of the bow clips and pockets may be reversed, i.e. the bow clips may be attached within the panel and the pockets may be formed on the sides of the cassettes.

As can be seen in FIG. 3, panel 12 includes forward side exit cable management devices in the form of multi-channel clips 76 and 78 located on opposing sides at the intersection of the front and sides of panel 12. Multi-channel clips 76 and 78 are identical and, thus, only multi-channel clip 76 will be further described herein. The channels on clip 76 provide management to the stack of three cassettes on the left side of the panel.

Figure 7:
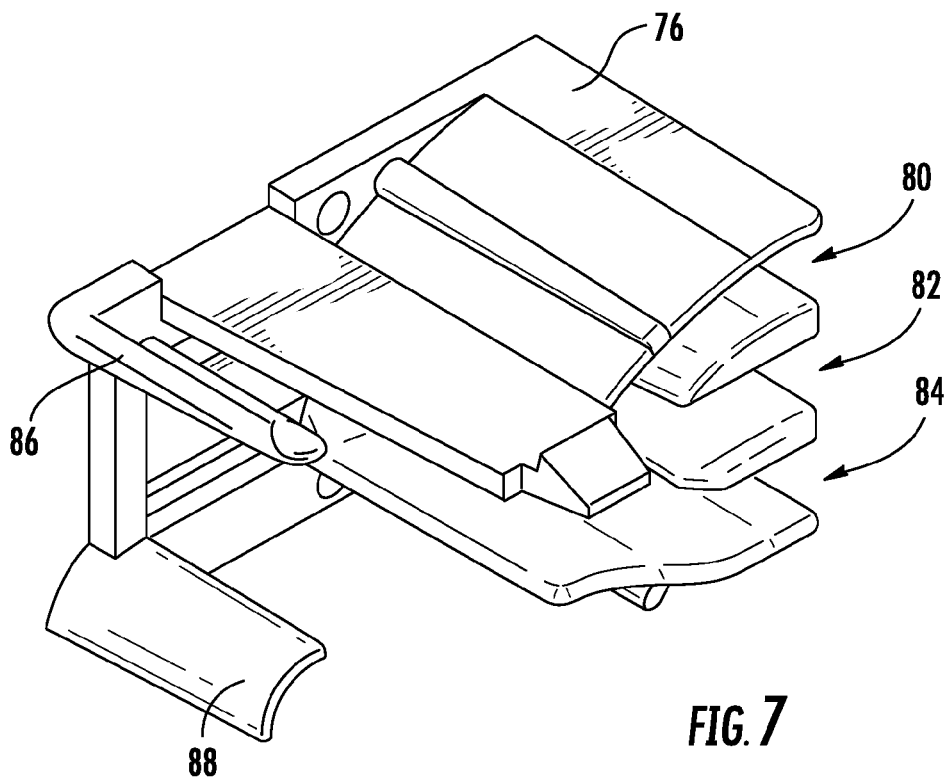
FIG. 7 is a perspective view of a cable management clip shown in FIG. 3.
Figure 8:
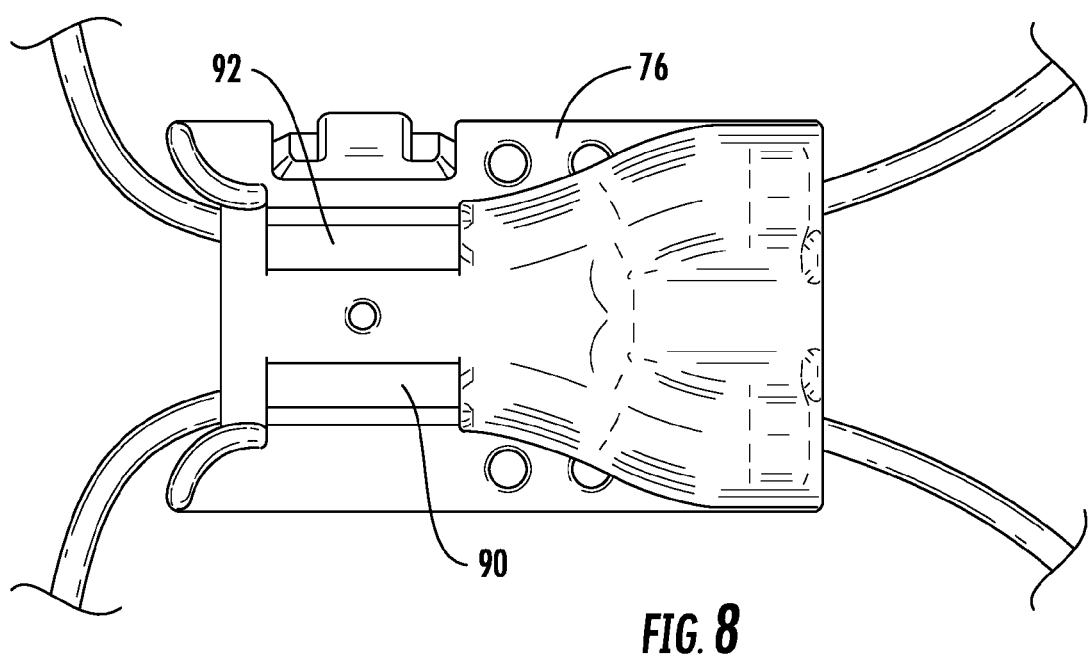
FIG. 8 is a side elevational view of the clip of FIG. 7.

FIG. 7 is a perspective view of multi-channel clip 76. FIG. 8 is a side elevational view of multi-channel clip 76. Multi-channel clip 76 includes top channel 80 preferably for receiving cables connected to each of the four top cassettes 40 in the four rows 38. Middle channel 82 preferably receives cables from the four middle cassettes 40 located in the four rows 38. Lower channel 84 preferably receives cables from the four lower cassettes 40 in the four rows 38. By using the three channels 80, 82 and 84, cables from the cassettes are appropriately segregated and managed. Multiple channel clip 76 receives cable from the left two rows of cassettes and clip 78 receives cable from the right two rows of cassettes. Multi-channel clip M further includes curved guides 86 and 88 which ease cable strain around the perimeter of the side exit. Guide 86 is provided for cable traveling upwardly and guide 88 is provided for cable traveling downwardly and guides the cable in those directions. The multi-channel clips 76 and 78 are held in place at the front side exit of the panel by means of affixing, such as screwing, the multi-channel clips to ears which protrude outwardly from the sides of panel 12.

As shown in FIG. 8, the multi-channel clip 76 includes slots 90 arid 92 which receive a strap (not shown), such as a cable tie or a strap, to secure the cable when the installation is completed.

Figure 9:
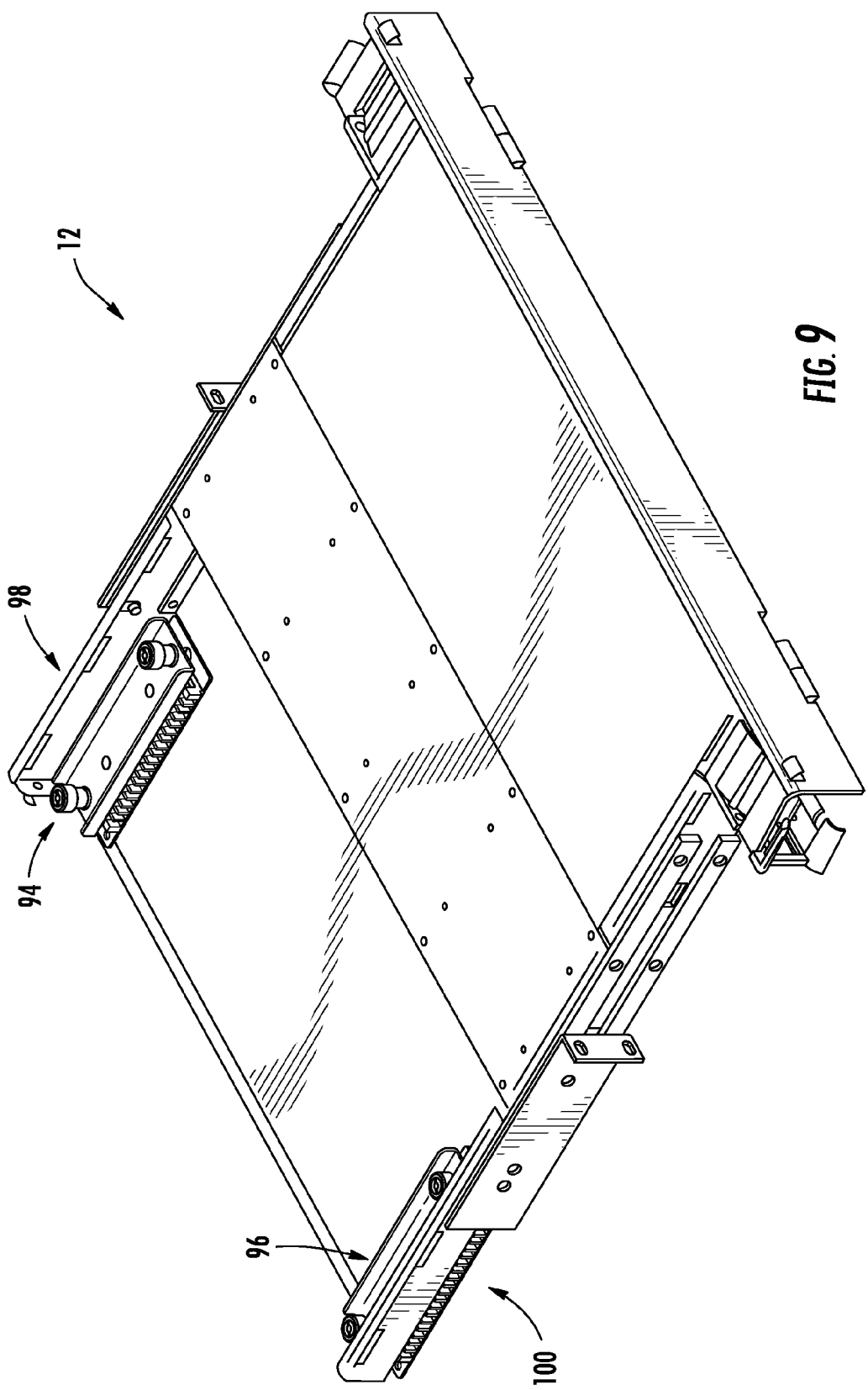
FIG. 9 is a perspective view of the panel of FIG. 1 with the rear cover removed.

FIG. 9 shows panel 12 with readily removable top 14 having been removed. Cable capture mechanisms 94 and 96 are provided adjacent to cable exit openings 98 and 100 on the rear portion of the panel 12. Since both cable capture mechanisms 94 and 96 are identical, only cable capture mechanism 94 will be described in detail herein.

Figure 10:
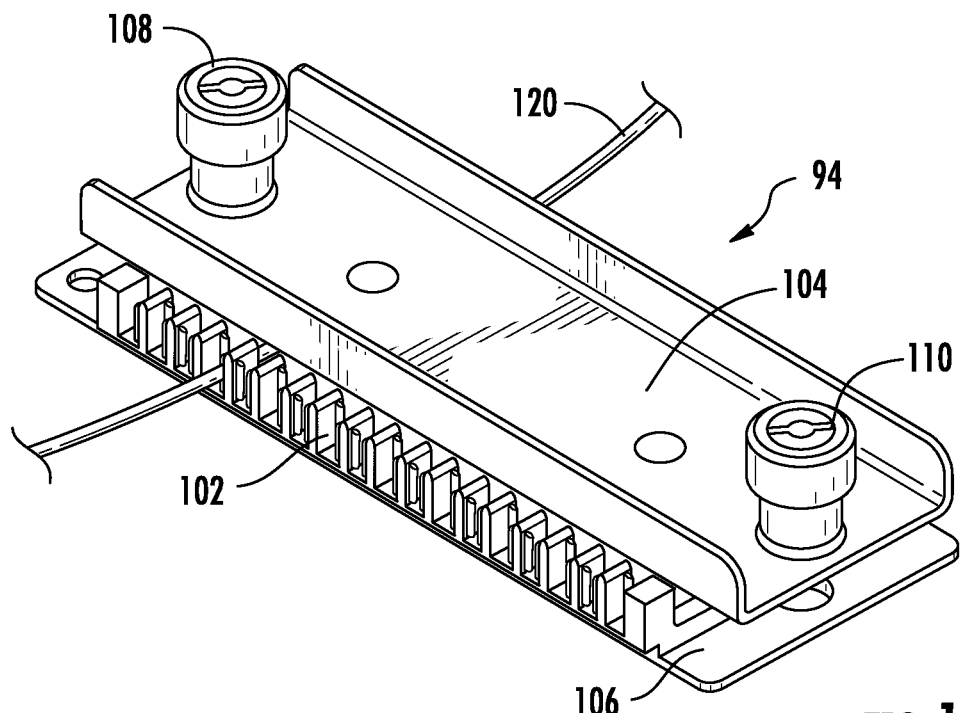
FIG. 10 is a more de led perspective view of the trunk cable capture mechanism shown in FIG. 9.

FIG. 10 shows a fully assembled cable capture mechanism 94. Cable capture mechanism 94 includes a ribbed pad 102, preferably made of a soft but resilient material such as rubber. Cable capture mechanism 94 also includes removable top plate 104 and ribbed pad mounting plate 106. Cable capture mechanism 94 is held in place adjacent to opening 98 by bolts 108 and 110.

Figure 11:
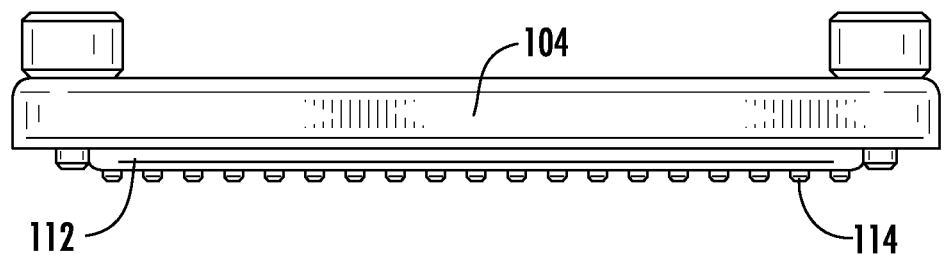
FIG. 11 is a side elevational view of the top portion of the trunk cable capture mechanism of FIG. 10.

As can be seen from FIG. 11, a second pad 112 is attached to the bottom of removable top plate 104. Pad 112 includes a plurality of lands 114. The bottom/top combination of pad 102 and pad 112 captures cable 120 firmly but does not apply excessive force to the fiber in the cable.

Figure 12:
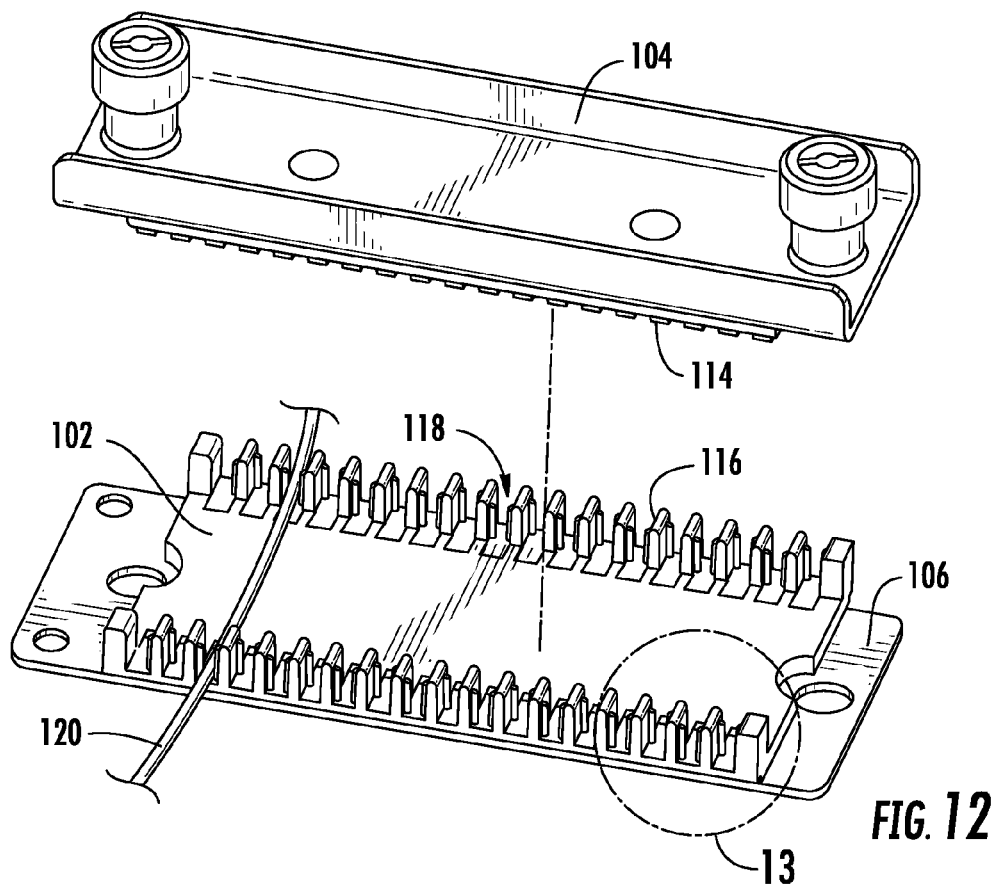
FIG. 12 is an exploded perspective view showing the bottom and top portion of the trunk cable capture mechanism of FIG. 10.

As can be seen from FIG. 12, pad 102 is mounted on plate 106. Two rows of ribs 116 project upwardly along the edges of pad 102. Adjacent ribs 116 form grooves 118 for receiving cable 120, Pad 112 is received between the two rows of ribs 116 when the cable capture mechanism is fully assembled and lands 114 are in register with grooves 118.

Figure 13:
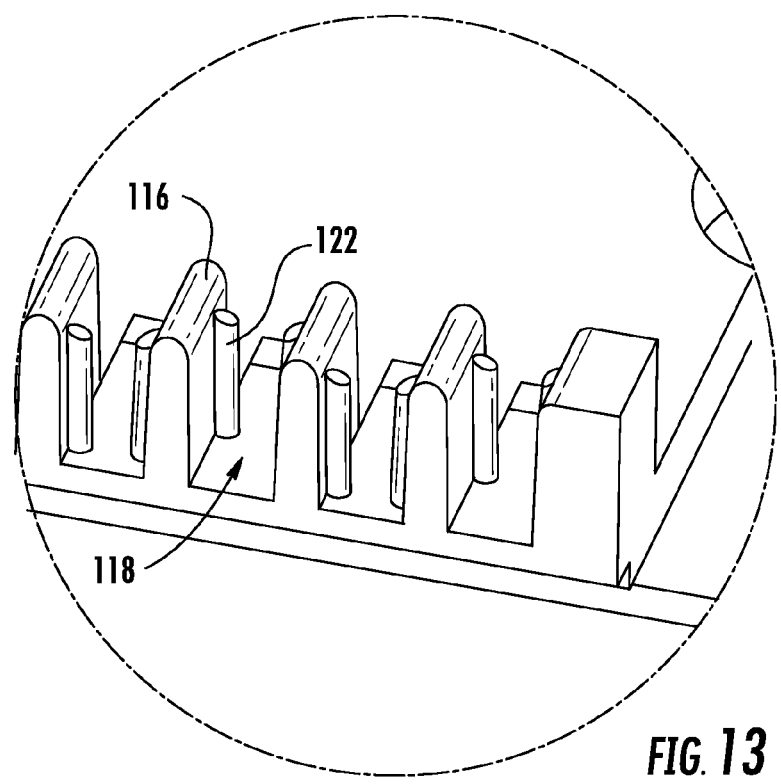
FIG. 13 is a detailed view showing a portion of the bottom of the trunk cable capture mechanism of FIG. 10.

As shown in FIG. 13, each rib 116 includes projection 122 on either side, Projection 122 helps hold the cable 120 in place within the groove 118 and enables the panel 12 to be used with various diameter cables. Cable capture mechanism 94 provides strain relief for the cables which are received at the rear side of cassette 40 after installation. It also provides for additional cable management. In addition, during cable installation, the individual cables are held in place in grooves 118 so that there is little strain or excess force exerted on the cable during installation and/or service. Also, since the cassettes are slidable within the panel, the installer will leave excess cable between the cable capture mechanism 94 and the cassettes 40. Since the cable capture mechanism 94 holds the cable in place, strain on the connections of the cable at or in cassette 40 is reduced.

While the preferred embodiment of the invention has been described in reference to optical fiber cables and connectors, it is also applicable to electrical cables and connectors.

From the foregoing descriptions of the embodiments of the invention, it will be apparent that many modifications may be made therein. It will be understood that these embodiments of the invention are exemplifications of the invention only and that the invention is not limited thereto.

The invention claimed is:

1. A telecommunications patching system comprising:
 a panel;
 at least one cassette adapted to be movably received in the panel;
 the cassette receiving a plurality of telecommunication connector jacks;
 each jack having a front cavity adapted to receive a patch cord plug having a patch cord cable extending therefrom;
 the cassette having first and second ends;
 a tab extending from the first end whereby the cassette may be readily moved to different positions in the panel; wherein the cassette has first and second sides; the panel having at least one rail engaging the first side of the cassette; a spring member associated with either the first side of the cassette or the rail; a pocket associated with either the first side of the cassette or the rail for engaging the spring member whereby the cassette may be temporarily held in place at one position in the panel.

2. A telecommunications patching system as set forth in claim 1 wherein the tab is attached to the first end of the cassette.

3. A telecommunications patching system as set forth in claim 1 wherein the tab includes a first cable guide.

4. A telecommunications patching system as set forth in claim 3 wherein the first cable guide includes a channel for receiving a portion of at least some of the patch cord cables.

5. A telecommunications patching system as set forth in claim 4 wherein the tab includes a second cable guide; the second cable guide includes a channel for receiving a portion of at least some of the patch cord cables.

6. A telecommunications patching system as set forth in claim 4 therein the panel has a front end, a rear end, and first and second sides; a first cable management clip attached to the panel near the panel near the intersection of the front end and the first side of the panel.

7. A telecommunications patching system as set forth in claim 6 wherein the first cable management clip includes at least a first channel for receiving the patch cord cable which is received in the first cable guide of the tab.

8. A telecommunications patching system as set forth in claim 7 wherein the first cable management clip includes second and third channels for receiving additional patch cord cables and providing simultaneous vertical and horizontal cable management.

9. A telecommunications patching system as set, forth in claim 1, further including a pair of uprights which form a part of a vertical rack; the panel horizontally engaging the pair of uprights.

10. A telecommunications patching system as set forth in claim 9 wherein the cassettes are received in horizontally in the panel.

11. A telecommunications patching system as set forth in claim 9, including another panel; the two panels adjacent to one another; the two panels engaging the uprights whereby the panels may be offset from one another.

12. A telecommunications patching system as set forth in claim 11, including a first bracket attached to one upright and a second bracket attached to the other upright; the first bracket interfacing with the first side of each panel and the second bracket interfacing with the second side of each panel.

13. A telecommunication patching system as set forth in claim 12, further including a spring member attached to each bracket; each side of each panel having a pocket for receiving the spring member.

14. A telecommunications patching system as set forth in claim 1 wherein the spring member is attached to the first side of the cassette and the pocket is associated with the rail.

15. A telecommunications patching system as set forth in claim 1, further including a second pocket spaced apart from the first pocket; whereby the cassette able to be held in two positions in the panel.

16. A telecommunications patching system as set forth in claim 1 wherein the panel includes a front portion and a rear portion; a plurality of trunk cables received in the second end of the cassette; a trunk cable capture mechanism attached to the rear portion of the panel for securing the trunk cables in the panel.

17. A telecommunications patching system as set forth in claim 16 wherein the trunk cable capture mechanism includes a pad made of soft resilient material; the pad including at least one row of spaced apart ribs forming grooves for receiving the trunk cable.

18. A telecommunications patching system as set forth in claim 17 wherein a substantial number of the ribs include a projection which extends into a groove.

* * * * *